United States Patent
Rawlinson

(10) Patent No.: US 9,054,402 B1
(45) Date of Patent: Jun. 9, 2015

(54) ELECTRIC VEHICLE BATTERY PACK PROTECTION SYSTEM

(71) Applicant: Atieva, Inc., Redwood City, CA (US)

(72) Inventor: Peter Dore Rawlinson, Worcestershire (GB)

(73) Assignee: Atieva, Inc., Menlo Park, CA (US)

( * ) Notice: Subject to any disclaimer, the term of this patent is extended or adjusted under 35 U.S.C. 154(b) by 41 days.

(21) Appl. No.: 14/132,179

(22) Filed: Dec. 18, 2013

Related U.S. Application Data

(63) Continuation-in-part of application No. 14/083,476, filed on Nov. 19, 2013.

(51) Int. Cl.
| | |
|---|---|
| *H01M 10/625* | (2014.01) |
| *F41H 7/04* | (2006.01) |
| *F41H 5/013* | (2006.01) |
| *F41H 5/04* | (2006.01) |
| *B60R 16/04* | (2006.01) |
| *B60K 1/04* | (2006.01) |

(52) U.S. Cl.
CPC .......... *H01M 10/5016* (2013.01); *F41H 7/042* (2013.01); *F41H 5/013* (2013.01); *F41H 5/04* (2013.01); *B60R 16/04* (2013.01); *B60K 1/04* (2013.01)

(58) Field of Classification Search
None
See application file for complete search history.

(56) References Cited

U.S. PATENT DOCUMENTS

| | | | |
|---|---|---|---|
| 2002/0162696 A1* | 11/2002 | Maus et al. | 180/68.5 |
| 2004/0016580 A1* | 1/2004 | Kronner et al. | 180/68.5 |
| 2006/0005695 A1* | 1/2006 | Honlinger et al. | 89/36.08 |
| 2009/0021052 A1* | 1/2009 | Kato | 296/203.01 |
| 2010/0216004 A1* | 8/2010 | Yoon | 429/99 |
| 2011/0052960 A1* | 3/2011 | Kwon et al. | 429/120 |
| 2012/0103714 A1 | 5/2012 | Choi et al. | |
| 2012/0160583 A1* | 6/2012 | Rawlinson | 180/68.5 |
| 2013/0071705 A1 | 3/2013 | Frutschy et al. | |
| 2013/0189558 A1 | 7/2013 | Haussmann | |
| 2014/0093766 A1 | 4/2014 | Fees et al. | |

* cited by examiner

*Primary Examiner* — J. Allen Shriver, II
*Assistant Examiner* — Hilary L. Johns
(74) *Attorney, Agent, or Firm* — Patent Law Office of David G. Beck

(57) ABSTRACT

A battery pack protection system is provided for use with an electric vehicle in which the battery pack is mounted under the car. The system utilizes a plurality of deformable cooling conduits located between the lower surface of each of the batteries and the lower battery pack enclosure panel, with a thermal insulator interposed between the conduits and the lower enclosure panel. A layer of thermally conductive material may be included which is interposed between the cooling conduits and the thermal insulator and in contact with a lower surface of each of the cooling conduits. The cooling conduits are configured to deform and absorb impact energy when an object, such as road debris, strikes the lower surface of the lower battery pack enclosure panel. Further protection may be achieved by positioning a ballistic shield, alone or with a layer of compressible material, under the bottom surface of the battery pack.

20 Claims, 8 Drawing Sheets

US 9,054,402 B1

ELECTRIC VEHICLE BATTERY PACK PROTECTION SYSTEM

CROSS-REFERENCE TO RELATED APPLICATION

This application is a continuation-in-part of U.S. patent application Ser. No. 14/083,476, filed 19 Nov. 2013, the disclosure of which is incorporated herein by reference for any and all purposes.

FIELD OF THE INVENTION

The present invention relates generally to electric vehicles and, more particularly, to a system for providing undercarriage protection to the battery pack of an electric vehicle.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, and cost.

In recent years there have been several incidents of a battery pack, either contained within a laptop computer or utilized in a vehicle, catching on fire. As a result, one of the primary issues impacting consumer confidence with respect to both hybrid and all-electric vehicles is the risk of a battery pack fire.

Rechargeable batteries, due to their chemistries, tend to be relatively unstable and more prone to thermal runaway than non-rechargeable batteries. Thermal runaway occurs when the battery's internal reaction rate increases to such an extent that it is generating more heat than can be withdrawn. If reaction rate and heat generation go unabated, eventually the heat generated becomes great enough to cause the battery and materials in proximity to the battery to combust. Typically thermal runaway is the result of a battery short, damage due to improper use or physical abuse, a manufacturing defect, or exposing the cell to extreme temperatures.

Hybrid and electric vehicle (EV) manufacturers use a variety of techniques to shield their battery packs from possible damage that may result from road debris or a vehicle collision. For example, in a vehicle using a relatively small battery pack such as a hybrid, the pack may be protected by placing it within the rear trunk, behind the rear seats, under the front seats, or in another comparatively well protected location. Vehicles utilizing large battery packs typically are forced to mount the pack under the car. To protect such a pack, a ballistic shield may be located between the road surface and the bottom of the pack, as disclosed in U.S. Pat. No. 8,286,743, issued 16 Oct. 2012, and U.S. Pat. No. 8,393,427, issued 12 Mar. 2013.

Although the prior art teaches a variety of mounting techniques that can either be used to place the battery pack in a relatively protected region of a car or to otherwise shield the battery pack from potential harm, given the severity of the consequences accompanying a catastrophic battery pack event, further techniques for protecting an undercarriage mounted battery pack are desired. The present invention provides such a protection system.

SUMMARY OF THE INVENTION

The present invention provides a battery pack protection system for use with an electric vehicle in which the battery pack is mounted under the car. The system utilizes a plurality of deformable cooling conduits located between the lower surface of each of the batteries within the pack and the lower battery pack enclosure panel, with a thermal insulator interposed between the conduits and the lower enclosure panel. The thermal insulator may be comprised of a layer of thermally insulating material (e.g., air), preferably with a thermal conductivity of less than 1.0 $Wm^{-1}K^{-1}$ at 25° C., and more preferably with a thermal conductivity of less than 0.2 $Wm^{-1}K^{-1}$ at 25° C. The battery pack may further include a layer of thermally conductive material in contact with each of the deformable cooling conduits, e.g., interposed between the cooling conduits and the thermal insulator and in contact with a lower surface of each of the cooling conduits.

The cooling conduits, which are configured to deform and absorb impact energy when an object strikes the lower surface of the lower battery pack enclosure panel, include one or more coolant channels that may utilize either a circular or non-circular cross-section. The coolant flowing within the coolant channels flows within a plane that is substantially parallel to the lower battery pack enclosure panel. Cylindrical batteries may be used, for example batteries utilizing an 18650 form factor, and positioned within the pack such that the cylindrical axis of each of the batteries is substantially perpendicular to the lower battery pack enclosure panel. The deformable cooling conduits may be fabricated from a plastic polymer material (e.g., polyethylene, polypropylene, etc.) and the lower battery pack enclosure panel may be fabricated from a metal (e.g., aluminum, steel, etc.).

In another aspect, a ballistic shield may be mounted under the electric vehicle and under the battery pack, thus providing additional battery pack protection. The ballistic shield, which is typically fabricated from either a metal or a high density plastic, is mounted at some distance (e.g., between 1 and 15 centimeters) from the bottom of the battery pack enclosure. A layer of a compressible material such as an open- or closed-cell foam or an open- or closed-cell sponge may be interposed between the battery pack and the ballistic shield.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The terms "battery pack" and "battery pack enclosure" may be used interchangeably and refer to an enclosure containing one or more batteries electrically interconnected to achieve the desired voltage and capacity. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle utilizes multiple sources of propulsion including an electric drive system.

Figure 1:
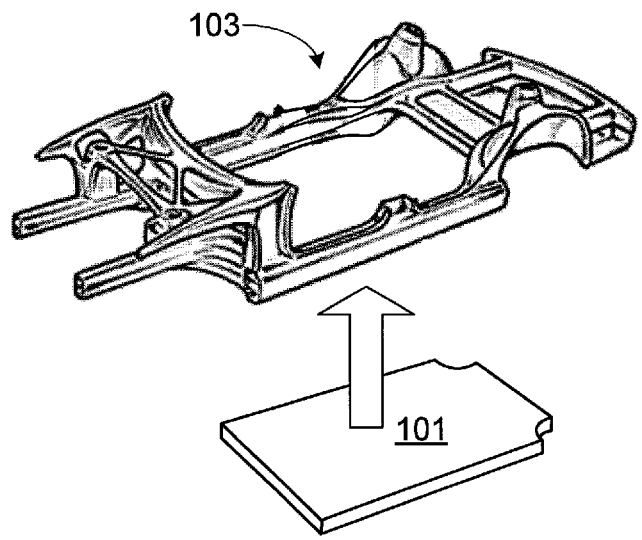
FIG. 1 provides a perspective view of a battery pack and the vehicle chassis to which it is to be mounted.

FIG. 1 provides a perspective view of a battery pack 101 configured to be mounted under vehicle chassis 103. It should be understood that the present invention is not limited to a specific battery pack mounting scheme, battery pack size, or battery pack configuration.

Figure 2:
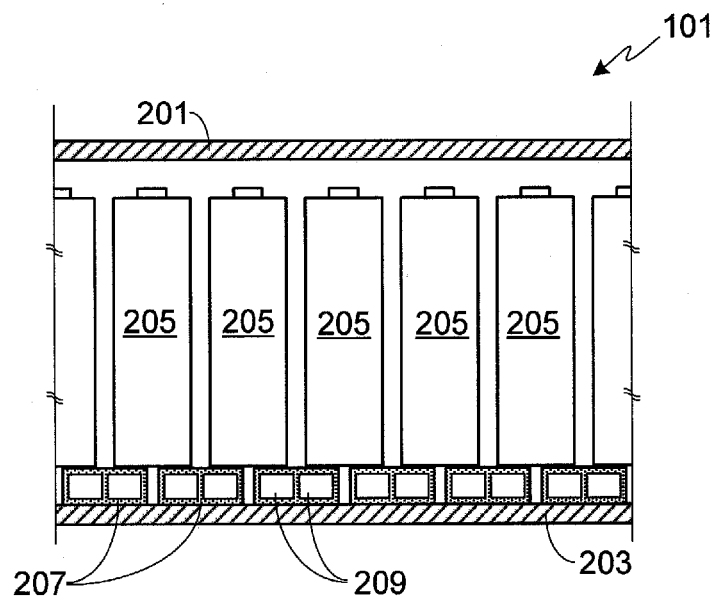
FIG. 2 provides a cross-sectional view of a portion of the battery pack shown in FIG. 1.

FIG. 2 provides a cross-sectional view of a portion of battery pack 101. For purposes of clarity, battery interconnects and battery mounts are not included in this view. Visible in FIG. 2 is a portion of the upper pack enclosure panel 201, a portion of the lower pack enclosure panel 203, and a plurality of batteries 205. Note that the enclosure side panels are not shown in this view. Batteries 205 are preferably cylindrical batteries, for example batteries utilizing an 18650 form-factor, and are positioned within the battery pack so that the axis of the cylinder (i.e., the cylindrical axis) is substantially perpendicular to both lower enclosure panel 203 and the surface of the road. Interposed between the base of each cylindrical battery 205 and lower panel 203 are a plurality of deformable cooling conduits 207 through which a liquid coolant, i.e., a heat transfer medium, is pumped. As shown, in the preferred embodiment cooling conduits 207 are aligned with lower panel 203, resulting in the coolant within channels 209 flowing in a direction substantially perpendicular to the axes of the cylindrical batteries. By regulating the flow of coolant within conduits 207 and/or regulating the transfer of heat from the coolant to another temperature control system, the temperature of cells 205 may be regulated so that the cells remain within their preferred operating range.

Figure 3:
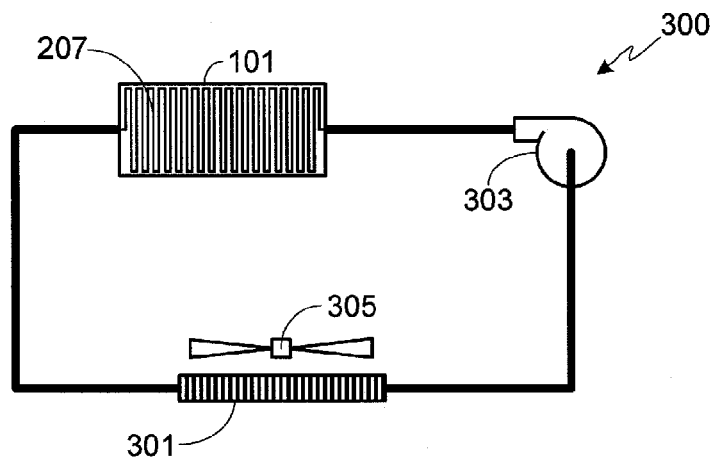
FIG. 3 illustrates an exemplary cooling system suitable for use with the battery pack deformable cooling conduits of the invention.
Figure 4:
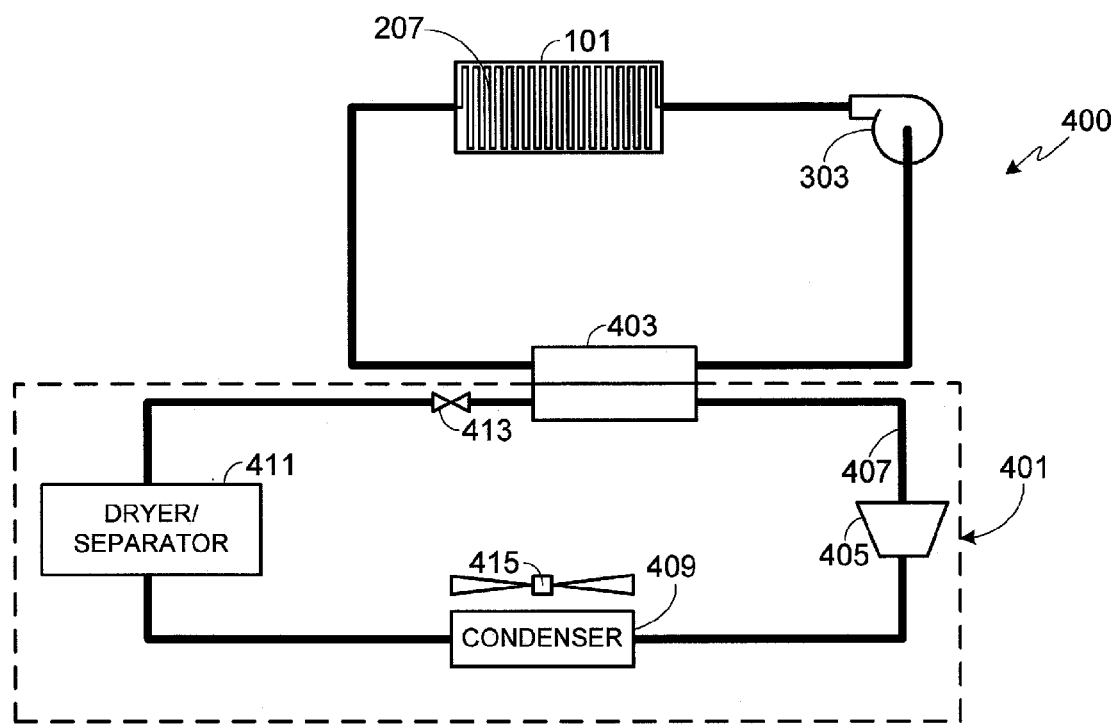
FIG. 4 illustrates an alternate exemplary cooling system suitable for use with the battery pack deformable cooling conduits of the invention.
Figure 5:
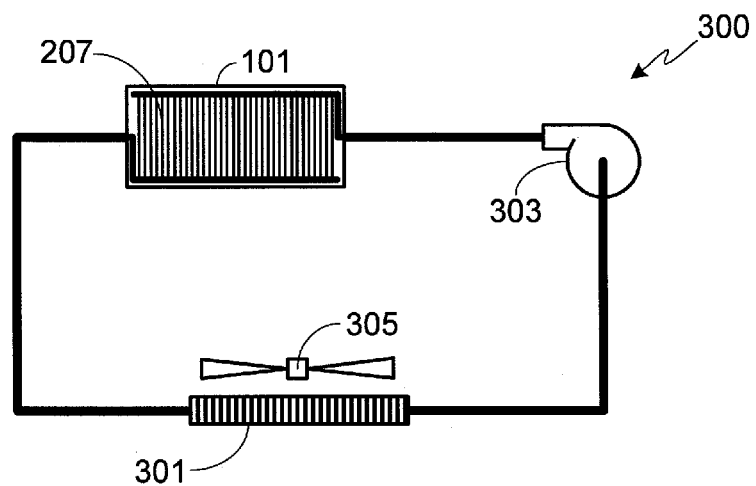
FIG. 5 illustrates the exemplary cooling system shown in FIG. 3 with a different coolant conduit configuration within the battery pack.

FIGS. 3 and 4 illustrate exemplary cooling systems that may be coupled to cooling conduits 207. In system 300 shown in FIG. 3, the coolant within conduits 207 is pumped through a radiator 301 using a pump 303. A blower fan 305 may be used to force air through radiator 301 to insure cooling when the car is stationary. In system 400 shown in FIG. 4, the coolant within conduits 207 is coupled to a thermal management system 401 via a heat exchanger 403. Preferably thermal management system 401 is a refrigeration system and as such, includes a compressor 405 to compress the low temperature vapor in refrigerant line 407 into a high temperature vapor and a condenser 409 in which a portion of the captured heat is dissipated. After passing through condenser 409, the refrigerant changes phases from vapor to liquid, the liquid remaining at a temperature below the saturation temperature at the prevailing pressure. The refrigerant then passes through a dryer 411 that removes moisture from the condensed refrigerant. After dryer 411, refrigerant line 407 is coupled to heat exchanger 403 via thermal expansion valve 413 which controls the flow rate of refrigerant into heat exchanger 403. Additionally, in the illustrated system a blower fan 415 is used in conjunction with condenser 409 to improve system efficiency. It should be understood that battery pack coolant conduits 207 may be coupled to other cooling/thermal management systems, and the cooling systems shown in FIGS. 3 and 4 are only meant to illustrate some common configurations for use with the conduits of the invention. Additionally, the geometry of cooling conduits 207 shown in FIGS. 3 and 4 is only meant to illustrate one possible configuration. For example, FIG. 5 shows the cooling system of FIG. 3 with a different conduit configuration within battery pack 101, one utilizing coolant manifolds. The invention may use other configurations as well, assuming that the conduits are placed between the batteries 205 and the lower enclosure panel 203 as previously described and illustrated.

Figure 6:
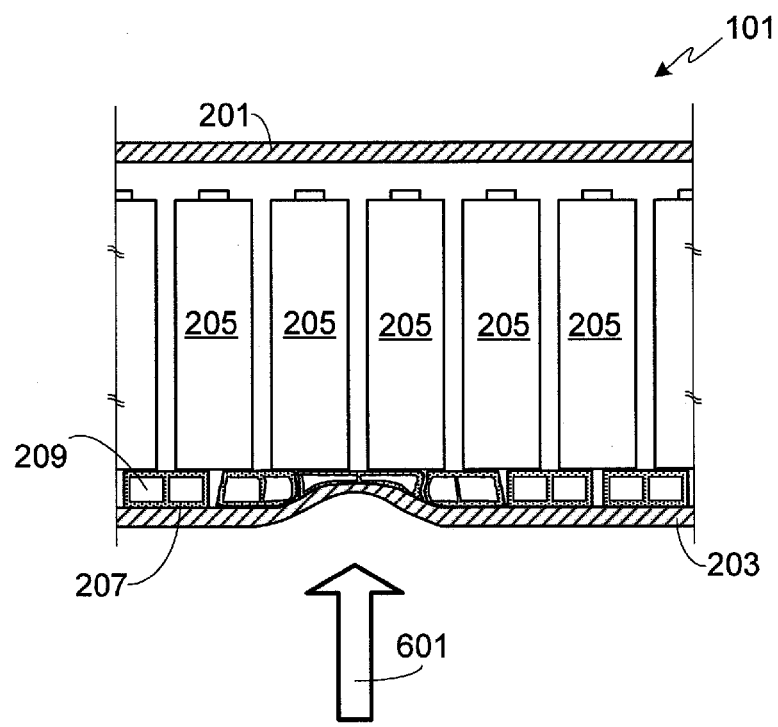
FIG. 6 provides the cross-sectional view of the battery pack portion shown in FIG. 2 after an object strikes the bottom of the battery pack enclosure.

Cooling conduits 207 serve a two-fold purpose. First, during normal operation of the vehicle and the battery pack, the coolant within conduits 207 draws heat away from batteries 205, thereby allowing the temperature of the batteries to remain within the preferred operating range. Second, during a non-normal event in which an object such as road debris from under the vehicle strikes the bottom panel 203 of pack 101, conduits 207 help to prevent catastrophic damage to the pack by absorbing energy through conduit deformation. As illustrated in FIG. 6, when an object under the vehicle is forced upwards in direction 601, the object causes the bottom enclosure panel 203 to deform as well as those portions of conduits 207 within the strike zone. As the lower panel 203 and the conduits within the strike region deform, energy is absorbed. If sufficient energy is absorbed through this process, damage to the batteries 205 within the strike region can be significantly limited, thereby potentially averting a thermal runaway event. Preferably conduits 207 are fabricated from polyethylene or a similar material which is capable of severe deformation without cracking or breaking. Additionally, by selecting an electrically non-conductive coolant, if conduits 207 do crack or break when deformed, the released coolant will not cause a short within the battery pack.

It will be appreciated that the thermal efficiency of the cooling system as well as the degree of protection afforded by the cooling conduits can be easily tailored to meet the design requirements for a particular vehicle. For example, in most applications cooling conduits 207 are fabricated from a thermally conductive material, thus insuring efficient transfer of heat from the batteries 205 to the battery thermal management system. However, as the inventor has found it generally desirable to limit thermal transfer between the cooling conduits 207 and the battery pack enclosure panel 203, in the preferred embodiment one or more layers of a thermal insulator are added between the conduits and the battery pack enclosure. For example, in the embodiment illustrated in FIG. 7, thermal transfer between the two structures is limited by placing an air gap 701 between cooling conduits 207 and the battery pack enclosure panel 203. In this embodiment stand-offs 703 help to insure the mechanical strength of the battery pack structure while still maintaining a sufficient air gap 701 to limit heat transfer to an acceptable level. Preferably stand-offs 703 are fabricated from a material with low thermal conductivity, for example less than 1.0 $Wm^{-1}K^{-1}$ at 25° C., and more preferably less than 0.2 $Wm^{-1}K^{-1}$ at 25° C. Stand-offs may be integral to panel 203, integral to conduits 207 (for example, extruded in the same extrusion as that used to fabricate the cooling conduits 207), or independent of both. A benefit of using an air gap 701 to separate the conduits from the lower enclosure panel, and for minimizing the number of stand-offs 703, is that when an object hits the lower surface of panel 203, the panel can deform prior to even impacting the deformable cooling conduits 207, thereby enhancing protection of batteries 205.

Figure 8:
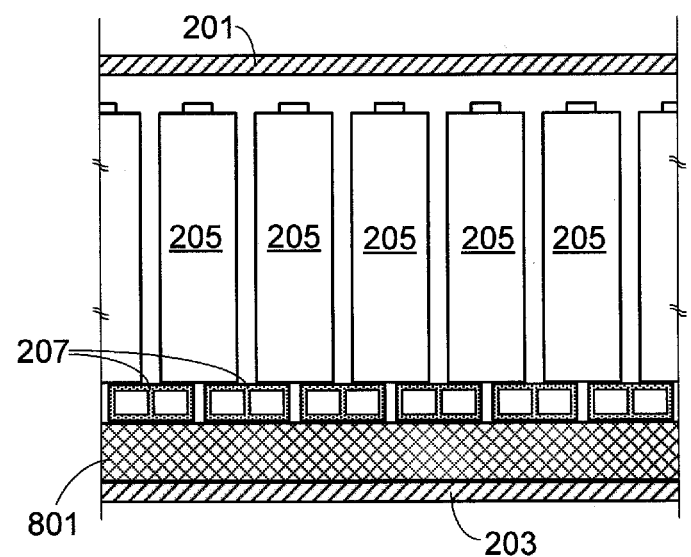
FIG. 8 provides the cross-sectional view of the battery pack portion shown in FIG. 2 with the inclusion of a layer of thermally insulating material located between the cooling conduits and the battery pack enclosure.

In the embodiment illustrated in FIG. 8, air gap 701 has been replaced with a layer 801 of a thermally insulating material, layer 801 preferably having a thermal conductivity of less than 1.0 $Wm^{-1}K^{-1}$ at 25° C., and more preferably of less than 0.2 $Wm^{-1}K^{-1}$ at 25° C. In one configuration, layer 801 is formed from a compressible material, thus allowing a degree of enclosure panel deformation prior to impacting conduits 207.

Figure 7:
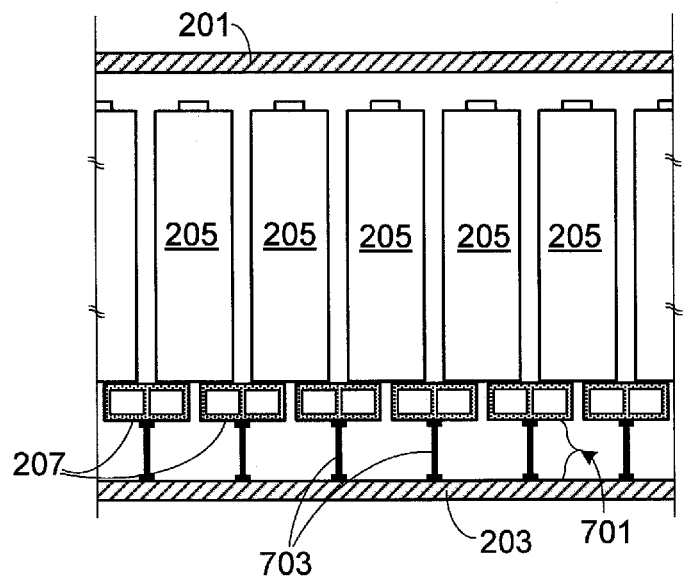
FIG. 7 provides the cross-sectional view of the battery pack portion shown in FIG. 2 with the inclusion of an air gap between the cooling conduits and the battery pack enclosure.
Figure 9:
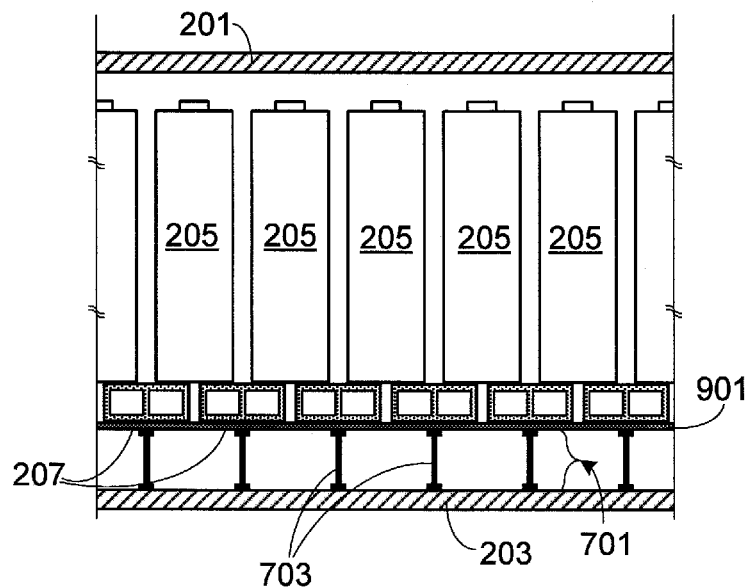
FIG. 9 provides the cross-sectional view of the battery pack portion shown in FIG. 7 with the inclusion of a sheet of thermally conductive material in contact with the lower surfaces of the cooling conduits.
Figure 10:
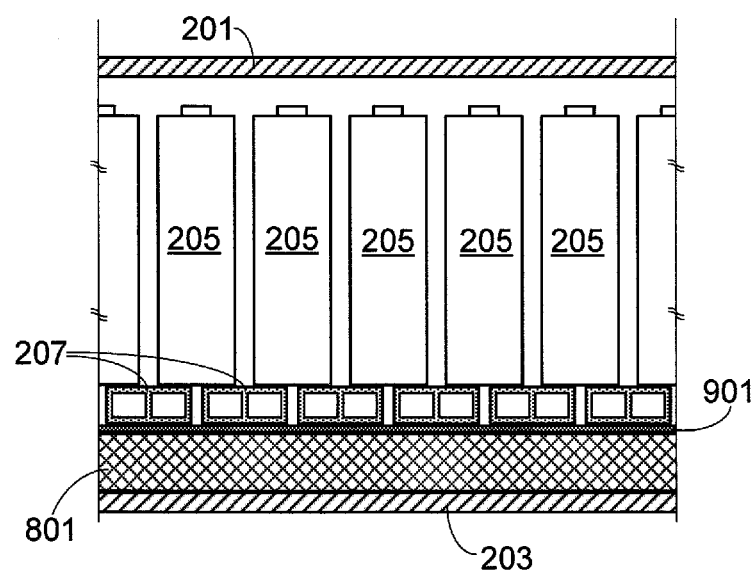
FIG. 10 provides the cross-sectional view of the battery pack portion shown in FIG. 8 with the inclusion of a sheet of thermally conductive material in contact with the lower surfaces of the cooling conduits.

FIGS. 9 and 10 illustrate modifications of the configurations shown in FIGS. 7 and 8, respectively. In these embodiments a layer 901 of thermally conductivity material, such as a sheet of aluminum, is placed in contact with the lower surface of each of the cooling conduits 207. Layer 901 transfers heat between cooling conduits, thereby helping to prevent localized heating, i.e., hot spots, for example when one battery begins to run at a higher temperature than the surrounding cells. In the embodiment illustrated in FIG. 9, layer 901 is thermally isolated from enclosure panel 203 by air gap 701 while in the embodiment illustrated in FIG. 10, sheet 901 is thermally isolated from enclosure panel 203 by low thermal conductivity sheet 801.

Figure 11:
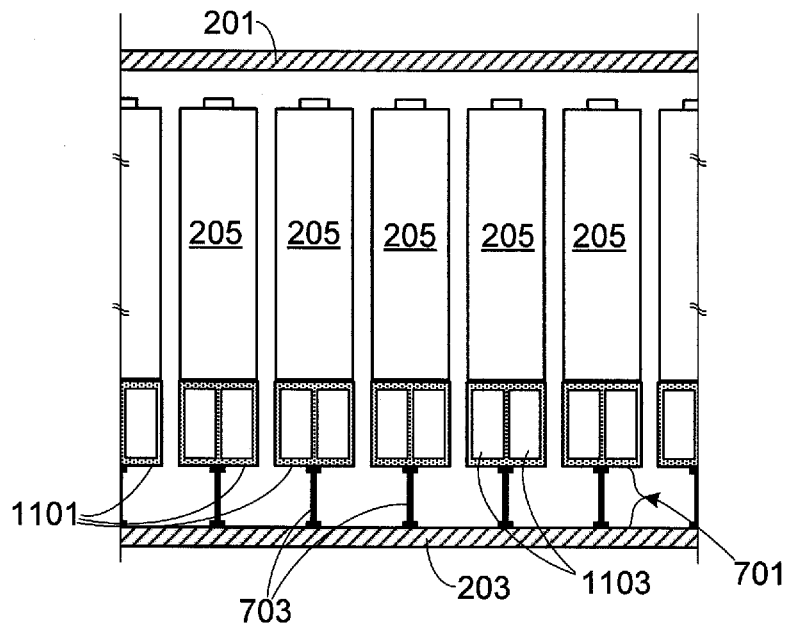
FIG. 11 provides the cross-sectional view of the battery pack portion shown in FIG. 7 with an alternate configuration for the deformable cooling conduits.

In addition to varying the thermal characteristics of the battery pack by adding one or more layers of thermally insulating and/or thermally conductive material between the cooling conduits and the battery pack enclosure, it should be understood that the configuration of the cooling conduits may also be tailored to meet the design requirements for a particular vehicle. For example and as shown in FIG. 11, by increasing the depth of the conduits, and thus the separation distance between lower enclosure panel 203 and batteries 205, a larger conduit deformation zone is provided. A larger conduit deformation zone, in turn, allows an object striking the bottom of the battery pack to deform both panel 203 and conduits 1101 to a much greater extent before the batteries are damaged.

Additionally, due to the larger internal diameter of channels 1103 within conduits 1101, a greater degree of conduit deformation may occur before coolant flow within the affected conduit stops completely. An added benefit of this approach is that the larger channels within conduits 1101 provide greater cooling capacity.

Figure 12:
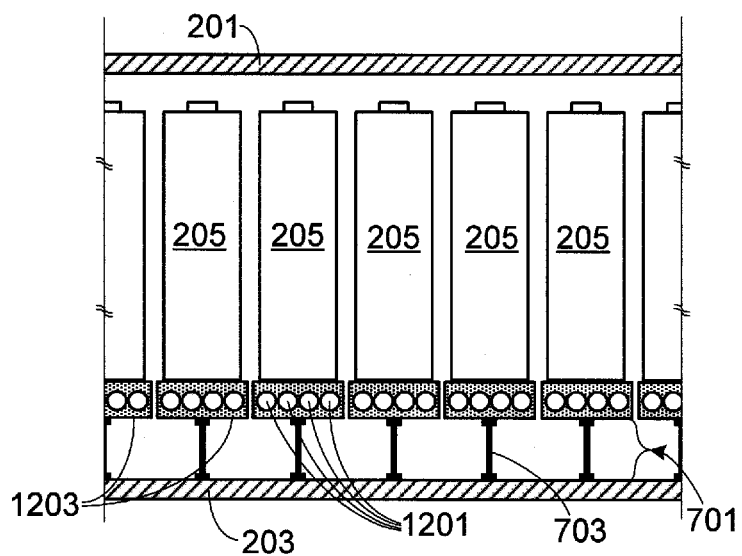
FIG. 12 provides the cross-sectional view of the battery pack portion shown in FIG. 7 with an alternate configuration for the deformable cooling conduits.

FIG. 12 illustrates another embodiment of the invention in which the number of channels 1201 within each conduit 1203 is increased and the shape of each channel has been changed to cylindrical. As a result, the compression strength of the conduits has been increased, leading to a less deformable structure. At the same time, given the size of the channels as well as the number of channels in proximity to each battery 205, during a deformation event (i.e., a collision with an object) it is less likely that all cooling will be terminated for any particular cell.

Figure 13:
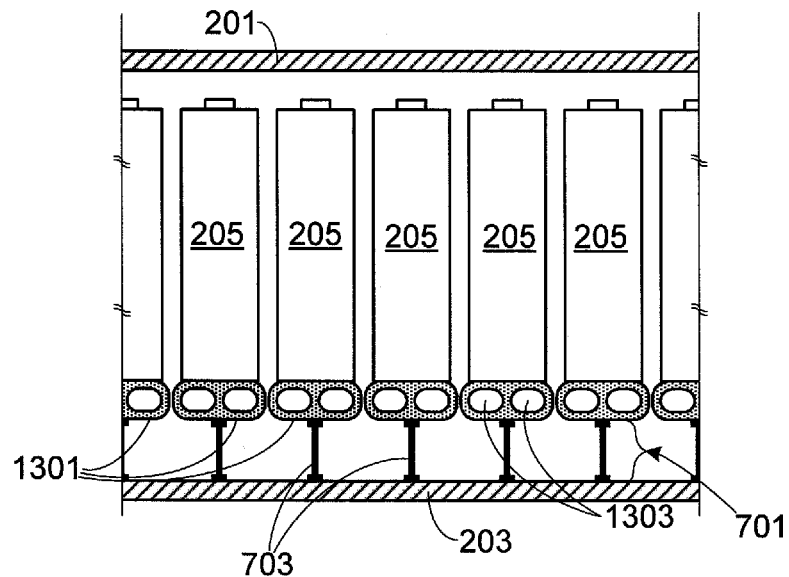
FIG. 13 provides the cross-sectional view of the battery pack portion shown in FIG. 7 with an alternate configuration for the deformable cooling conduits.

FIG. 13 illustrates another embodiment of the invention. In this embodiment both the corners of each conduit 1301 and the corners of each channel 1303 within the conduits are rounded. As a result, the large conduit surface area in contact with the battery structures is retained while still achieving a conduit which is less likely to break during deformation.

As previously noted, the undercarriage crumple zone of the present invention can be tailored to meet the specific requirements for a particular vehicle design. Therefore a vehicle in which the battery pack is very exposed, for example due to a low mounting location under the vehicle, or in which the battery pack is more likely to encounter more road debris, for example in a sport utility vehicle (SUV), can be provided with more protection than a vehicle in which the battery pack is less exposed or less likely to encounter road debris. Features of the crumple zone that can be altered to achieve the desired characteristics include the number of channels per conduit, width and height of the conduits, cross-sectional shape and size of each channel, cross-sectional shape and size of each conduit, conduit wall thickness (i.e., the thickness of the wall separating the channels from the outer conduit wall), conduit material, lower enclosure panel thickness, and lower enclosure panel material. Preferably the deformable cooling conduits are made from a plastic polymer such as polyethylene or polypropylene. If desired, the material may be treated to improve thermal conductivity, while still retaining its electrically non-conductive properties. The lower enclosure panel is preferably fabricated from a metal such as aluminum or steel, although other materials may be used (e.g., a thermally insulating composite material).

Figure 14:
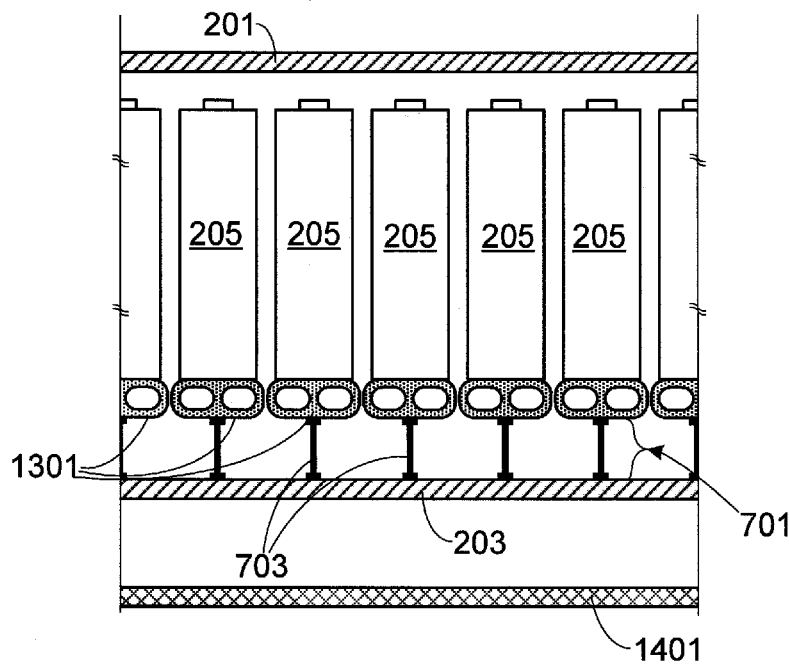
FIG. 14 provides the cross-sectional view of the battery pack portion shown in FIG. 13 with the addition of an underlying ballistic shield.

In at least one embodiment, and as illustrated in FIG. 14, the performance of the undercarriage crumple zone is enhanced through the inclusion of a ballistic shield 1401 mounted between the lower battery pack enclosure panel 203 and the road surface (not shown). Shield 1401 absorbs some of the impact energy from road debris or other objects prior to those objects striking the outer surface of panel 203. Furthermore, by spacing shield 1401 at some distance from panel 203 as shown in the preferred embodiment, shield 1401 is less likely to be driven into the lower enclosure panel during a strike. Accordingly, while shield 1401 may be mounted to, and in contact with, panel 203, preferably it is spaced between 1 and 15 centimeters apart from panel 203. Shield 1401 may be fabricated from a metal (e.g., aluminum), although preferably a lighter weight material such as a high density plastic is used in order to lower vehicle weight.

Figure 15:
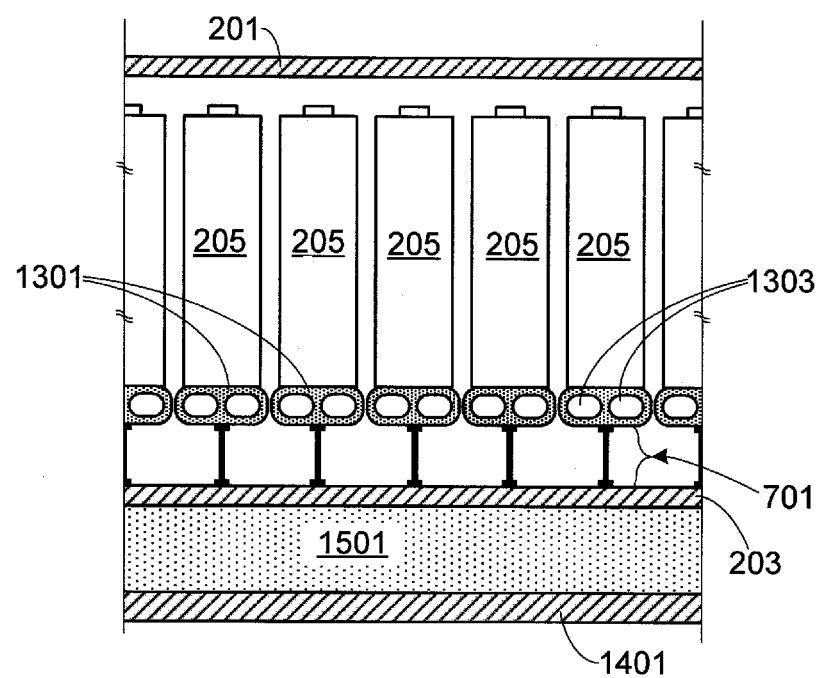
FIG. 15 provides the cross-sectional view of the battery pack portion shown in FIG. 14 with the addition of a compressible layer interposed between the battery pack lower panel and the ballistic shield.

FIG. 15 illustrates a modification of the embodiment shown in FIG. 14. In the illustrated embodiment, a layer of a compressible material 1501 is interposed between shield 1401 and lower enclosure panel 203 to aid in impact energy absorption. Preferably layer 1501 is fabricated from an openor closed-cell sponge or foam, for example fabricated from silicone or urethane, although other similar low density materials may be used for layer 1501. It should be understood that the It should be understood that while the embodiments illustrated in FIGS. 11-15 utilize the configuration shown in FIG. 7 as the underlying structure, these embodiments may also use a layer of thermally insulating material such as that shown in FIG. 8, or a layer of thermally insulating material as well as a thermally conductive layer placed in contact with the lower surface of each of the cooling conduits as shown in FIGS. 9 and 10.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A battery pack protection system, comprising:
a battery pack mounted under an electric vehicle, wherein said battery pack is configured to house a plurality of batteries;
a plurality of deformable cooling conduits interposed between a lowermost surface of each of said plurality of batteries and an upper surface of a lower battery pack enclosure panel, wherein integral to each of said plurality of deformable cooling conduits is at least one coolant channel, and wherein said plurality of deformable cooling conduits are configured to deform and absorb impact energy when an object strikes a lower surface of said lower battery pack enclosure panel; and
a thermal insulator interposed between said plurality of deformable cooling conduits and said upper surface of said lower battery pack enclosure panel.

2. The battery pack protection system of claim 1, wherein said thermal insulator is comprised of a layer of a thermally insulating material with a thermal conductivity of less than 1.0 $Wm^{-1}K^{-1}$ at 25° C.

3. The battery pack protection system of claim 2, wherein said plurality of deformable cooling conduits are separated from said upper surface of said lower battery pack enclosure panel by a gap, wherein said gap is filled with said layer of said thermally insulating material, and wherein said layer of said thermally insulating material is comprised of air.

4. The battery pack protection system of claim 3, further comprising a plurality of stand-offs within said gap and separating said plurality of deformable cooling conduits from said upper surface of said lower battery pack enclosure panel.

5. The battery pack protection system of claim 1, further comprising a layer of thermally conductive material in contact with each of said plurality of deformable cooling conduits.

6. The battery pack protection system of claim 1, wherein said plurality of deformable cooling conduits are positioned within said battery pack such that coolant within said at least one coolant channel of said plurality of deformable cooling conduits flows within a plane that is substantially parallel to said upper surface of said lower battery pack enclosure panel.

7. The battery pack protection system of claim 1, wherein each of said plurality of batteries utilizes a cylindrical form factor, and wherein said plurality of batteries are positioned within said battery pack such that a cylindrical axis corresponding to each of said plurality of batteries is substantially perpendicular to said lower battery pack enclosure panel.

8. The battery pack protection system of claim 7, wherein said plurality of deformable cooling conduits are positioned within said battery pack such that coolant within said at least one coolant channel of each of said plurality of deformable cooling conduits flows within a plane that is substantially perpendicular to said cylindrical axis corresponding to each of said plurality of batteries.

9. The battery pack protection system of claim 1, wherein each of said plurality of deformable cooling conduits includes a plurality of coolant channels, and wherein each of said plurality of coolant channels has a circular cross-section.

10. The battery pack protection system of claim 1, wherein each of said plurality of deformable cooling conduits includes a plurality of coolant channels, and wherein each of said plurality of coolant channels has a non-circular cross-section.

11. The battery pack protection system of claim 1, wherein each of said plurality of deformable cooling conduits is comprised of a plastic polymer material.

12. The battery pack protection system of claim 11, wherein said plastic polymer material is selected from the group consisting of polyethylene and polypropylene.

13. The battery pack protection system of claim 1, further comprising a ballistic shield mounted under said electric vehicle and below said battery pack, wherein said ballistic shield is interposed between said battery pack and a road surface.

14. The battery pack protection system of claim 13, wherein said ballistic shield is spaced apart from said lower battery pack enclosure panel by a distance within the range of 1 centimeter to 15 centimeters.

15. The battery pack protection system of claim 13, wherein said ballistic shield is fabricated from a metal.

16. The battery pack protection system of claim 13, wherein said ballistic shield is fabricated from a high density plastic.

17. The battery pack protection system of claim 13, further comprising a layer of a compressible material interposed between said ballistic shield and said battery pack.

18. The battery pack protection system of claim 13, wherein said compressible material is selected from the group of materials consisting of open-cell sponge, open-cell foam, closed-cell sponge and closed-cell foam.

19. The battery pack protection system of claim 1, wherein said lower battery pack enclosure panel is comprised of a metal.

20. The battery pack protection system of claim 1, wherein said lower battery pack enclosure panel is comprised of a thermally insulating composite material.

* * * * *